3,578,675
Patented May 11, 1971

3,578,675
2-(3'-FLUORO-2'-NAPHTHYL)-BENZIMIDAZOLES
Dale R. Hoff, Cranford, and Louis H. Peterson, Woodbridge, N.J., assignors to Merck & Co., Inc., Rahway, N.J.
No Drawing. Continuation of application Ser. No. 527,520, Feb. 15, 1966. This application June 9, 1969, Ser. No. 834,593
Int. Cl. C07d 49/38
U.S. Cl. 260—309.2     3 Claims

ABSTRACT OF THE DISCLOSURE

Anthelmintically active benzimidazoles having an o-fluoronaphthyl group at the 2-position are prepared by a variety of processes including reaction of an o-nitroaniline or o-phenylenediamine with 3-fluoro-2-naphthoic acid or an equivalent thereof wherein the carboxylic acid radical is derivatized to a radical such as an ester, imidoester, amide, carbonyl halide or nitrile.

---

This application is a continuation of prior copending application Ser. No. 527,520, filed Feb. 15, 1966, now abandoned.

This invention relates generally to new benzimidazole compounds. More particularly, it relates to benzimidazoles having at the 2-position an o-fluoro naphthyl radical. It is concerned also with chemical syntheses of such compounds, with acid addition salts thereof, and with compositions containing them as active anthelmintic agents. The invention relates also to intermediates used in the preparation of these benzimidazoles.

In accordance with the present invention, it has been found that benzimidazoles having a 2'-naphthyl-3'-fluoro substituent at the 2-position of the benzimidazole ring have an unexpectedly high degree of anthelmintic activity and may be effectively employed in the treatment and/or prevention of the parasitic disease helminthiasis. The parent compound namely 2-(3'-fluoro-2'-naphthyl)-benzimidazole has the structural formula:

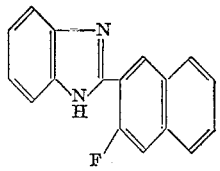

The benzimidazole ring may be further substituted, and particularly at the 1- and/or 5-positions, as fully described hereinafter. It is an object of this invention to provide new and novel 2-(3'-fluoro-2'-naphthyl)-benzimidazoles. It is a further object to provide methods of making such compounds. It is a still further object to provide compositions containing such substances as active anthelmintic agents. Further and more detailed objects will be evident from the ensuing description of the invention.

The 2-(3'-fluoro-2'-naphthyl)-benzimidazoles of this invention may be described by the formula

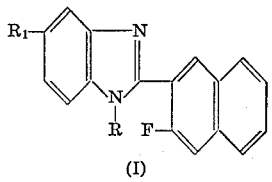

(I)

In this structure R represents hydrogen, loweralkyl, loweralkenyl, loweralkanoyl or aroyl. Specific examples of such substituents being methyl, ethyl, propyl, allyl, methallyl, acetyl, propionyl, butyroyl, benzoyl, and substituted benzoyl such as p-halobenzoyl, p-nitrobenzoyl, or toluoyl. $R_1$ represents hydrogen, halogen, phenyl, halophenyl, loweralkoxyphenyl, loweralkyl, halololoweralkyl, loweralkoxy, loweralkylthio, thienyl, phenoxy, phenylthio, amino, loweralkylamino, or diloweralkylamino. Representative examples of such substituents that may be present at the 5-position are fluoro, chloro, methyl, ethyl, methoxy, methylthio, ethylthio, p-fluorophenyl, p-methoxyphenyl, ethylamino, and dimethylamino.

The acid addition salts of the 2-(3'-fluoro-2'-naphthyl)-benzimidazoles which have hydrogen at the 1-position are also a part of this invention. Such salts are readily obtained by treatment of the benzimidazole compound with acid. Typical salts which may be formed in this manner are mineral acid salts such as the hydrohalides, e.g. hydrochloride, hydrobromide, and hydroiodide, sulfates, nitrates, phosphates, and the like, aliphatic acid salts such as the acetate, trimethylacetate, t-butylacetate, or propionate salts of polycarboxylic acids such as the citrate, oxalate, succinate and the like and salts of other insoluble organic acids such as the embonate and hydroxynaphthoate salts. Certain of these salts are more water soluble than the free bases. This is true of the hydrohalides. Since the solubility may also be decreased by formation of an appropriate salt, it will be seen that the solubility properties of a particular compound may within reason be adjusted by judicious selection of a salt. When the compounds of this invention are used in salt form as anthelmintics, it is, of course, desirable that the particular acid employed be an edible, non-toxic one.

The 2-(3'-fluoro-2'-naphthyl)-benzimidazoles are novel compounds which may be prepared in a number of ways. One method of synthesis comprises broadly the condensation of o-nitroaniline or o-phenylenediamine of the structure

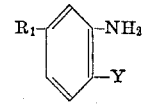

where $R_1$ is as previously defined, and Y is —$NO_2$ or —$NH_2$, with 3-fluoro-2-naphthoic acid or an equivalent thereof wherein the carboxylic acid radical is derivatized to a radical such as an ester, imidoester, amide, carbonyl halide or nitrile. Such 3-fluoro-2-naphthoic acid or derivative thereof may be represented by the structure

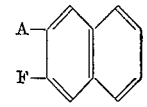

where A is carboxy, loweralkyl carboxylic ester such as carbomethoxy, carbethoxy and carbopropoxy, an imido ester such as a loweralkyl imidate, e.g. ethyl carboximido or methyl carboximido, a carbonyl halide such as carbonyl chloride or bromide, carboxamido or cyano.

One of the preferred embodiments for making the 2-(3'-fluoro-2'-naphthyl)-benzimidazoles according to this general method comprises the reaction of a 4-$R_1$-o-phenylene-diamine, where $R_1$ is as defined above, and is preferably hydrogen, with a loweralkyl 3-fluoro-2-naphthimidate acid addition salt such as ethyl 3-fluoro-2-naphthimidate hydrochloride, methyl 3-fluoro-2-naphthimidate hydrochloride, or propyl 3-fluoro-2-naphthimidate hydrobromide. Formation of the desired benzimidazole is brought about by contacting the reactants in a suitable solvent such as a lower alkanol. Good results are obtained using essentially equimolar quantities of reactants, or a slight excess of lower alkyl 3-fluoro-2-naphthimidate acid addition salt and carrying out the reaction at about room temperature or slightly above for 20–120 minutes.

According to another embodiment of the general process described above, 2-(3'-fluoro-2'-naphthyl)- benzimidazoles are prepared by reacting together o-phenylenediamine (or a 4-R₁-o-phenylenediamine) and 3-fluoro-2-naphthoic acid (or derivative thereof) in polyphosphoric acid. The process is carried out at elevated temperatures, and preferably at temperatures of about 150–300° C. The optimum reaction time and temperature will vary somewhat with the particular reactants, but in general good yields of the desired compounds are obtained by conducting the process at temperatures of about 175° to about 275° C. for from 2 to 6 hours. It is preferred to employ a loweralkyl-3-fluoro - 2 - naphthoate or 3-fluoronaphthalene-2-carboxamide as starting material, although the free acid may be used if desired. Generally, substantially equimolar amounts of fluoronaphthoic acid compound and the diamine are used, with from about 5–20 parts by weight of polyphosphoric acid per part of fluoronaphthoic acid compound. The relative amounts of reactants are not, however, a critical feature of this aspect of the invention. The desired 2-(3'-fluoro-2'-naphthyl)-benzimidazoles are recovered by cooling the reaction mixture and diluting it with water. Where the benzimidazoles do not crystallize readily under these conditions, they are precipitated by neutralizing the quenched mixture with a base such as ammonium hydroxide, an alkali metal hydroxide or an alkali metal carbonate.

In an additional embodiment of the invention, 2-(3'-fluoro-2'-naphthyl)-benzimidazoles are obtained by heating a mixture of an o-phenylenediamine and a loweralkyl 3-fluoro-2-naphthoate with an aqueous mineral acid such as aqueous sulfuric or phosphoric acid in a closed system, i.e. an autoclave or bomb. The process is conducted at temperatures of from about 120–180° C. for 3–10 hours, and the resulting benzimidazole recovered from the acid reaction mixture by isolation and purification techniques known to those skilled in this art.

In those cases where an o-nitroaniline is one of the starting materials, it is customary for the other reactant to be loweralkyl 3-fluoro-2-naphthoate or 3-fluoronaphthalene-2-carbonyl chloride. An intermediate nitroanilide is formed initially, and the nitro group is reduced and benzimidazole formation effected by treatment of the intermediate anilide with a metal-acid reducing system such as iron-hydrochloric acid, zinc-hydrochloric acid or zinc-acetic acid. Alternatively, the nitro group may be reduced by catalytic reduction and the benzimidazole obtained by treatment of the amino anilide with acid as described above.

In accordance with another process embodiment of this invention, the 2-(3'-fluoro-2'-naphthyl) - 5 - R₁-benzimidazoles described herein, where R₁ is as previously defined, are prepared by the reaction of o-phenylenediamine or 4-R₁-o-phenylenediamine with 3-fluoro-2-naphthaldehyde. The reaction is carried out in a suitable solvent medium such as a loweralkanol, e.g. methanol, ethanol, isopropanol or t-butanol. The first product formed is the Schiff base of the aldehyde and the primary amine. In normal practice this is not isolated but rather converted directly to the benzimidazole. The ring closure of the Schiff base to the 2-(3'fluoro-2'naphthyl)-benzimidazole is effected with a suitable oxidizing agent such as cupric acetate, lead tetraacetate, mercuric acetate, air and the like. Alternatively, the reaction may be carried out in a nitrobenzene solvent medium at reflux temperature, in which case the 2-substituted benzimidazole is obtained directly from the reaction mixture, and separate Schiff base reduction is obviated.

According to another process for making the benzimidazoles of the invention, an appropriately substituted aniline may be reacted with a 3-fluoro-2-naphthonitrile in the presence of a Friedel-Crafts type catalyst such as AlCl₃ to form an N'-phenylamidine derivative of the naphthalene compound. Treatment of this latter substance with hydroxylamine to produce N'-phenyl-N-hydroxy- amidine derivative and reaction of this latter substance with a loweralkyl or aryl sulfonyl halide and then a base will produce the benzimidazole.

The 2-(3'-fluoro-2'-naphthyl) - 5 - R₁-benzimidazoles obtained as described above may be converted to the corresponding 1-alkyl, 1-alkenyl or 1-acyl benzimidazoles by a method that comprises formation of an alkali metal salt of the benzimidazole, and preferably the sodium salt, by treatment with sodium hydride or sodium alkoxide, and subsequent reaction of said salt with an alkylating or acylating agent. Examples of suitable alkylating agents are esters or strong acids with a loweralkanol or alkenol, such as methyl bromide, ethyl iodide, propyl bromide and allyl bromide, or with a dialkyl sulfate such as dimethyl sulfate. The 1-acylated benzimidazoles are obtained by contacting the alkali metal salt an acyl halide such as acetyl chloride, acetyl bromide, propionyl chloride, butyryl chloride, valeroyl bromide, benzoyl chloride, phenylacetyl chloride and the like. Normally, the acyl halide is added directly to a solution or suspension of the benzimidazole salt in an inert solvent, and the acylation reaction allowed to proceed at temperatures of room temperature up to about 100° C. Reaction temperatures in the range of 50–75° C. are preferred. The solvent employed as the reaction medium is preferably a hydrocarbon solvent such as benzene, toluene, xylene, petroleum ether and the like either alone or mixed with other solvents miscible therewith such as dimethylformamide.

The 1-substituted benzimidazoles thus formed are recovered from the reaction mixture by techniques known in the art, such as removal of the organic solvent and crystallization of the residual solid from solvents such as ether or mixtures of ether with other solvents.

Examples of the compounds which may be obtained according to the above described processes are 2-(3'-fluoro-2'-naphthyl)-benzimidazole,
1-p-chlorobenzoyl-2-(3'-fluoro12'-naphthyl)-benzimidazole,
1-acetyl-2-(3'-fluoro-2'-naphthyl)-benzimidazole,
2-(3'-fluoro-2'-naphthyl)-5-phenyl benzimidazole,
2-(3'-fluoro-2'-naphthyl)-5-fluorophenyl benzimidazole,
2-(3'-fluoro-2'-naphthyl)-5-methoxy benzimidazole,
2-(3'-fluoro-2'-naphthyl)-5-dimethylamino benzimidazole,
1-methyl-2-(3'-fluoro-2'-naphthyl)-5-fluoro benzimidazole,
2-(3'-fluoro-2'-naphthyl)-5-trifluoromethyl benzimidazole,
2-(3'-fluoro-2'-naphthyl)-5-amino benzimidazole,
1-allyl-2-(3'-fluoro-2'-naphthyl)-benzimidazole,
2-(3'-fluoro-2'-naphthyl)-5-fluoro benzimidazo, and
2-(3'-fluoro-2'-naphthyl)-5-phenoxy benzimidazole.

The starting materials of the compounds of the present invention may be made from known materials. For example, the various 3-fluoro-2-naphthoic acid and naphthoic acid derivative starting materials may be prepared from 3-amino-2-naphthoic acid which is commercially available by treating said acid with diazomethane thereby esterifying the reactant. The resulting methyl-3-amino-2-naphthoate may then be treated with fluoboric acid and sodium nitrate at low temperature to obtain the corresponding 3-diazofluoborate. When heated to about 150° C., methyl-3-fluoro-2-naphthoate results. This starting material may be converted to the free acid by hydrolysis. The acid, in turn, may be heated with thionyl chloride to obtain the corresponding 3-fluoro-2-naphthoic acid chloride. Treatment of the acid chloride with anhydrous ammonia provides 3-fluoronaphthalene-2-carboxamide which, upon heating and treatment with thionyl and dimethylformamide provides 3-fluoro-2-naphthonitrile. Addition of the nitrile to absolute ethanol at low temperatures and treatment with anhydrous hydrogen chloride provides ethyl-3-fluoro-2-naphthimidate hydrochloride.

3-fluoro-2-naphthaldehyde may be prepared from a 3-fluoro-2-naphthoic acid ester such as loweralkyl ester by dissolving the same in a suitable solvent such as ether and adding this mixture to a mixture containing a Grignard derivative of N-methylaniline. N-methyl-N-phenyl-2-fluoronaphthyl carboxamide is formed which then dissolved in tetrahydrofuran and treated with lithium aluminum hydroxide yields the 2-fluoronaphthaldehyde starting material.

The 2-(3'-fluoro-2'-naphthyl)-benzimidazoles of this invention exhibit a surprisingly high degree of anthelmintic activity and are useful in the treatment and prevention of helminthiasis, a parasitic disease which causes widespread and often serious infection in domesticated animals such as swine, horses, cattle, sheep and goats. In treating domesticated animals, the compounds may be administered orally with an ingestible carrier. For instance, they may be mixed with a non-toxic, edible material to form a feed supplement which is then incorporated in the animal feed in the desired concentration, or they may be administered in unit dosage forms which, in the case of large domesticated animals, take the form of boluses, or in the form of a liquid drench. Alternatively, water-soluble salts or a dispersible, wettable powder containing the anthelmintic agent may be added to the drinking water of the animals.

The preferred dosage level for treating a helminth infection will depend to a large extent on the particular benzimidazole compound being employed, on the severity of the invention and on the particular species of animal to be treated. In general, the benzimidazoles exhibit anthelmintic activity when administered to animals in a daily dose of about 10 to about 500 mg. per kilogram of animal body weight. It is preferred to employ in the range of 50 to 200 mg. of benzimidazole per kilogram of body weight per day. The compounds may be given in a single dose or divided into a plurality of smaller doses. With the compounds of this invention highly satisfactory results in freeing the animal of helminths are achieved by administering the compounds for only a single day at the above levels. If desired, the course of treatment may be extended over a period of days in which case the optimum daily dose level may be lowered. When the compounds are to be employed primarily as prophylactic agents for the prevention of helminthic infections, the preferred daily dose level is, of course, lower than the therapeutic level and is preferably in the range of about 1 to 100 mg. per kilogram of body weight.

The means employed for administering these benzimidazoles to animals are not critical, and any of the methods now used or available for treating animals infected with or susceptible to parasitic infections are satisfactory. When these substances are employed therapeutically to treat an established infection, they are conveniently administered in a unit dosage form such as in a capsule, bolus, tablet, or as a liquid drench. It will be noted that all of these methods contemplate oral administration, since this is the most effective method of treating the worm-infested stomach or intestinal tract.

When the benzimidazoles are to be administered in unit dosage form, capsules, boluses or drenches containing the desired amount of anthelmintic distributed in a pharmaceutically acceptable vehicle are usually employed. These are prepared by intimately and uniformly mixing the active ingredient with suitable finely divided diluents, suspending agents, fillers, wetting agents, lubricants, disintegrating agents and/or binder such as starch, lactose, talc, magnesium stearate, vegetable gums and the like. Suspending agents are particularly valuable when a drench is desired and should be used in such amount as to permit a uniform suspension of the active ingredient in water. Suspending agents such as acacia, tragacanth, Veegum (colloidal magnesium-aluminum silicate, R. E. Vanderbilt Co.), carboxypolymethylene, algins, methylcellulose, hydroxyethylcellulose and others are useful in this regard. The exact quantity of suspending agent to be employed will depend upon the concentration of active anthelmintic ingredient and the particular suspending agent being utilized.

These unit dosage formulations may be widely varied with respect to their total weight and content of anthelmintic agent, depending on factors such as the type of host animal to be treated, the dose level desired, and the severity and type of parasitic infestation. In general, tablets, boluses and drenches containing from about 5–70% by weight of active ingredient may be satisfactorily employed to supply the desired dosage.

For large animals such as sheep, swine or cattle, boluses weighing up to 15 grams may be used, although it is preferred to employ boluses weighing from 2–10 grams and containing from 1–5 grams of the anthelmintic agent. These boluses, as well as smaller size tablets, contain binder and lubricants, and are compounded by techniques known in this art. Capsules are readily prepared by mixing the active ingredient with a diluent such as starch or lactose and filling into the capsule.

In order to treat infected animals by means of a drench, the benzimidazoles are mixed with a suspending agent such as bentonite and the solid product added to water just prior to administration. Alternatively, ready-to-use drench formulations, such as those disclosed in U.S. Pat. No. 2,918,403 are sometimes utilized. The preferred drenches in accordance with this invention contain from about 5–50% by weight of the fluoronaphthyl benzimidazole.

The benzimidazoles described herein may also be administered as a component of the feed of the animals or dissolved or suspended in the drinking water. According to the invention, novel feed and feed supplement compositions are provided in which compounds of Formula I above are present as an active anthelmintic ingredient. Such compositions comprise the benzimidazoles intimately dispersed in or admixed with an inert carrier or diluent, i.e., one that is nonreactive with the benzimidazole and that may be administered with safety to the animals. The carrier or diluent is preferably one that is or may be an ingredient of the animal ration.

In the feed compositions the active ingredient is present in relatively large amounts. These supplements are suitable for addition to the feed either directly or after an intermediate dilution or blending step. Examples of carriers or diluents suitable for such compositions are solid orally ingestible carriers such as distiller's dried grains, corn meal, citrus meal, fermentation residues, ground oyster shells, Attapulgus clay, wheat shorts, molasses solubles, corn cob meal, edible vegetable substances, toasted dehulled soya flour, soybean mill feed, antibiotic mycelia, soya grits, crushed limestone and the like. The anthelmintic agents are intimately dispersed or admixed throughout the solid inert carrier by methods such as grinding, stirring, milling or tumbling. By selecting proper diluents and by altering the ratio of carrier to active ingredient, compositions of any desired concentration may be prepared. Formulations containing from about 5% to about 50% by weight, and preferably from about 10–30% by weight, of active ingredient are particularly suitable for addition to feeds. The active compound is normally dispersed or mixed uniformly in the diluent but in some instances may be sorbed on the carrier.

Examples of typical feed supplements containing the benzimidazole dispersed in a solid carrier are:

(A)

| | Lbs. |
|---|---|
| 2-(3'-fluoro-2'-naphthyl)-benzimidazole | 20 |
| Wheat shorts | 80 |

(B)

| | |
|---|---|
| 1-acetyl-2-(3'-fluoro-2'-naphthyl)-benzimidazole | 15 |
| Citrus meal | 85 |

(C)

| | |
|---|---|
| 2-(3'-fluoro-2'-naphthyl)-5-fluoro benzimidazole | 30 |
| Corn cob meal | 40 |
| Ground oyster shells | 30 |

These and similar feed supplements are prepared by uniformly mixing the appropriate benzimidazole with the carrier or carriers. Such supplements are added to the finished animal feed in an amount adequate to give the final concentration desired for controlling or treating helminthiasis by way of the animal ration. Although the preferred level in feeds will depend on the particular compound being employed, the anthelmintic compounds of this invention are normally fed at levels of 0.10–2.0% in the feed. One advantageous method of administering the compounds of this invention to animals whose feeds are conveniently pelleted, such as sheep is to incorporate them directly in the pellets. Alternatively the benzimidazoles may be incorporated in salt licks or salt blocks at any desired concentration (concentrations of 5–25% by weight are conveniently employed. Large animals, such as sheep, cattle and goats, then receive the anthelmintics with their salt.

The following examples are given for the purpose of illustration and not by way of limitation.

EXAMPLE 1

2-(3'-fluoro-2'-naphthyl)-benzimidazole

To a stirred solution of 0.90 g. (8.34 mmoles) of o-phenylenediamine in 10 ml. of methanol there is added 2.28 g. of ethyl-3-fluoro-2-naphthimidate hydrochloride. The mixture is stirred for 75 minutes, diluted with 25 ml. of water and then treated with 10 ml. of 10% aqueous sodium bicarbonate. The precipitate of 2-(3'-fluoro-2'-naphthyl)-benzimidazole is filtered off, washed with ether and air dried. It weighs 1.8 g. The product is dissolved in hot benzene and the solution is decanted from a little water. The benzene solution is allowed to cool. When crystallization begins the benzene solution is reheated to boiling. It is then chilled, and the solid removed by filtration. The solid is washed with benzene, ether and petroleum ether to give substantially pure 2-(3'-fluoro-2'-naphthyl)-benzimidazole, M.P. 192.5–193° C.

When 2-amino-4-fluoro aniline, 2-amino-4-chloroaniline,
3,4-diaminobiphenyl,
3,4-diamino-4'-fluorobiphenyl,
2-amino-4-methoxy aniline,
3,4-diamino-3'-methoxybiphenyl,
2-amino-4-ethyl aniline,
2-amino-4-chloroethyl aniline,
2-amino-4-methylthio aniline,
2-amino-4-(2'-thienyl)-aniline,
2-amino-4-phenoxy aniline,
2-amino-4-phenylthio aniline,
2,4-diamino aniline,
2-amino-4-ethylamino aniline,
or 2-amino-4-dimethylamino aniline is used in the above process in place of o-phenylenediamine, there is obtained
2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or
2-(3'-fluoro-2'-naphthyl)-5 - diethylamino benzimidazole, respectively.

EXAMPLE 2

2-(3'-fluoro-2'-naphthyl)-benzimidazole 10 g. of 3-fluoro-2-naphthoic acid is refluxed with 80 ml. of thionyl chloride until hydrogen chloride evolution ceases. The mixture is then evaporated to dryness in vacuo and the naphthoic acid chloride added portionwise to a solution of 15 g. of o-nitroaniline in 150 ml. of dry pyridine at room temperature. The mixture is then heated on the steam bath with stirring for about 1 hour. The solution is then poured onto ice. The resulting precipitate is filtered off and washed with water, 2.5 N hydrochloric acid, water, saturated sodium bicarbonate solution and finally with fresh water. The solid is recrystallized from acetone to give N-(2-nitrophenyl)-3-fluoro-2-naphthalene carbamide.

8 g. of N-(2-nitrophenyl)-3-fluoro-2-naphthalene carbamide in 200 ml. of ethanol is reduced with nitrogen at 50° C. using 3 gm. of 5% palladium on charcoal catalyst. The catalyst is then filtered off and washed well with excess boiling ethanol. The combined ethanol solutions are concentrated in vacuo to a value of about 500 ml. in hydrochloric acid to precipitate a solid. The mixture is refluxed for 6 hours and then allowed to come to room temperature. The precipitated solid, 2-(3'-fluoro-2'-naphthyl)-benzimidazole hydrochloride, is filtered off and suspended in ethanol. An excess of concentrated ammonium hydroxide is added. A precipitate forms. Ethanol is added until a homogeneous solution forms. The solution is treated with decolorizing charcoal and filtered into a large volume of water. The precipitate which forms is recrystallized from ethyl acetate to give substantially pure 2-(3'-fluoro-2'-naphthyl)-benzimidazole.

When 2-nitro-4-aniline, 2-nitro-4-chloro aniline,
3-amino-4-nitrobiphenyl,
3-amino-4-nitro-4'-fluorobiphenyl,
2-nitro-4-methoxy aniline,
3-amino-4-nitro-3'-methoxybiphenyl,
2-nitro-4-ethyl aniline,
2-nitro-4-chloroethyl aniline,
2-nitro-4-methylthio aniline,
2-nitro-4-(2'-thienyl)-aniline,
2-nitro-4-phenoxy aniline,
2-nitro-4-phenylthio aniline,
2,4-diamino nitrobenzene,
2-nitro-4-ethylamino aniline,
or 2-nitro-4-dimethylamino aniline is used in the above process in place of o-nitroaniline, there is obtained
2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole,
or 2-(3'-fluoro-2'-naphthyl)-5-dimethylamino benzimidazole, respectively.

EXAMPLE 3

2-(3'-fluoro-2'-naphthyl)-5-fluorobenzimidazole 2 g. of 3-fluoro-2-naphthonitrile is added to 2.5 g. of 4-fluoroaniline at 25° C. and 3 g. of powdered aluminum chloride is gradually stirred into the mixture over a period of about 2 minutes. The reaction mixture is then heated at 180° C. for 20 minutes, cooled to room temperature and the reaction mass dissolved in 100 ml. of 75% ethanol. The resulting solution is made strongly alkaline with 25% aqueous sodium hydroxide solution and then extracted with 3×70 ml. of chloroform. The chloroform extracts are combined, washed with water and dried over potassium carbonate. The chloroform solution is filtered and treated with 1.0 g. of decolorizing charcoal. The charcoal is removed by filtration and the charcoal treatment repeated once more. The resulting yellow solution is concentrated to dryness in vacuo and the residue dissolved in 25 ml. of isopropanol. The pH of the solution is adjusted to 1–1.5 with isopropanolic hydrogen chloride and 500 ml. of ether added slowly, with stirring, at about 10° C. After addition of ether is complete, the mixture is stirred for 1 hour and the resulting solid removed by filtration. The solid is washed with small portions of ether and petroleum ether and dried in vacuo at 250° C. to give N-(4'-fluorophenyl)-(3-fluoronaphthlene - 2 - amidine)-hydrochloride.

To a solution of 1 g. of hydroxylamine hydrochloride in 10 ml. of water there is added 2 g. of N-(4'-fluorophenyl) - (3-fluoronaphthalene-2-amidine)-hydrochloride and 10 ml. of ethanol. .8 g. of sodium bicarbonate is then added and the reaction mixture stirred for 10–15 minutes in an oil bath at a temperature of 95° C. The solution is then cooled to room temperature and an additional 800 mg. of sodium bicarbonate is added. Following the second addition the reaction mixture is stirred at 20–25° C. for 10 minutes. It is then diluted with 20 ml. of water and extracted with 3×25 ml. of chloroform. The chloroform extracts are combined, washed with 10 ml. of water and dried over magnesium sulfate. The organic solvent solution is filtered and concentrated to dryness in vacuo. The oily residue is triturated with petroleum ether in order to crystallize the N-(4'-fluorophenyl)-(2-fluoronaphthalene-2-hydroxyamidine). This amidine is recovered by filtration and then dried in vacuo. It is recrystallized from water to give substantially pure material.

35 mg. of methane sulfonylchloride in 1 ml. of benzene is added dropwise at 5° C. to a mixture of 60 mg. of N-(4'-fluorophenyl) - (2-fluoronaphthalene - 2 - hydroxyamidine) in 3 ml. of benzene and 0.2 ml. of pyridine. The resulting mixture is allowed to stand at room temperature for 15 hours and the solid pyridine hydrochloride then removed by filtration. The filtrate is concentrated to dryness in vacuo and the resulting residue treated with 5 ml. of an 0.1 N sodium carbonate solution. The resulting solid is separated and dissolved in 2 ml. of 0.1 N hydrochloric acid. The acid solution is filtered and the pH then adjusted to 6 with ammonium hydroxide. 2-(3'-chloro-2'-naphthyl)-5-fluoro benzimidazole precipitates and is recovered by filtration, washing with water and drying in vacuo.

When aniline, 4-chloroaniline, 4-amino biphenyl, 4-amino-4'-fluoro biphenyl, 4-methoxy aniline, 3'-methoxy biphenyl, 4-ethyl aniline, 4-chloroethyl aniline, 4-methylthio aniline, 4-(2'-thienyl)-aniline, 4-phenoxy aniline, 4-phenylthio aniline, 4-ethylamino aniline or 4-dimethylamino aniline is used in the above process in place of 4-fluoroaniline, there is obtained 2-(3'-fluoro-2'-naphthyl)-benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'-fluoro-2'-naphthyl)-5-phenylthio benzimidazole,
2-(3'-fluoro-2'-naphthyl)-5-ethylamino benzimidazole, or
2-(3'-fluoro-2'-naphthyl)-5-dimethylamino benzimidazole, respectively.

EXAMPLE 4

2-(3'-fluoro-2'-naphthyl)-benzimidazole 10 g. of 3-fluoro-2-carbethoxy naphthalene, 10 g. of o-phenylenediamine, and 40 g. of polyphosphoric acid are mixed and heated with stirring at 175° C. in a nitrogen atmosphere for three hours. The solution is then cooled to about 100° C. and then slowly poured with stirring into about 500 ml. of cold water. The resulting suspension is then neutralized to precipitate more of the product. The solid is washed with water, sodium bicarbonate solution, and dried in air. The 2-(3'-fluoro-2'-naphthyl)-benzimidazole is treated with charcoal and recrystallized from ethyl acetate solution.

When 2-amino-4-fluoro aniline,
2-amino-4-chloro aniline,
3,4-diaminobiphenyl,
3,4-diamino-4'-fluorobiphenyl,
2-amino-4-methoxy aniline,
3,4-diamino-3'-methoxybiphenyl,
2-amino-4-ethyl aniline,
2-amino-4-chloroethyl aniline,
2-amino-4-methylthio aniline,
2-amino-4-(2'-thienyl)-aniline,
2-amino-4-phenoxy aniline,
2-amino-4-phenylthio aniline,
2,4-diamino aniline,
2-amino-4-ethylamino aniline, or 2-amino-4-dimethylamino aniline is used in the above process in place of o-phenylenediamine, there is obtained 2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidabole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or 2-(3'-fluoro-2'-naphthyl)-5-dimethylamino benzimidazole, respectively.
2-(3'-fluoro-2'-naphthyl)-5-ethylamino benzimidazole, or
2-(3'-fluoro-2'-naphthyl)-5-dimethylamino benzimidazole, respectively.

EXAMPLE 5

2-(3'-fluoro-2'-naphthyl)-5-(4'-fluorophenyl)-benzimidazole 12 g. of 3-fluoro-2-naphthoic acid bromide is treated with 20 g. of 2-nitro-4-(4'-fluorophenyl)-aniline in 125 ml. of dry pyridine at room temperature for 30 minutes and then at 75° C. for 1 hour. The resulting 2-nitro-4(4'-fluorophenyl) - (3'-fluoro) - 2 - naphthyl anilide is then poured onto ice. The resulting precipitate is filtered, washed with water, then with 2.5 normal hydrochloric acid, again with water, then with saturated sodium bicarbonate solution and finally with fresh water. The solid is then recrystallized from ethyl acetate. The nitroanilide product is reduced with hydrogen at 50° C. using 3 g. of 5% palladium over Darco. The catalyst is then filtered and washed with hot ethanol. The combined ethanol solutions are combined in vacuo and hydrochloric acid is added at sufficient quantity to precipitate 2-(3'-fluoro-2'-naphthyl)-5-(4'-fluorophenyl)-benzimidazole. The product is then filtered and recrystallized from ethyl acetate.

When o-nitroaniline, 2-nitro-4-fluoro aniline,
2-nitro-4-chloro aniline,
3-amino-4-nitrobiphenyl,
2-nitro-4-methoxy aniline,
3-amino-4-nitro-3'-methoxybiphenyl,
2-nitro-4-ethyl aniline,
2-nitro-4-chloroethyl aniline,
2-nitro-4-methylthio aniline,
2-nitro-4-(2'-thienyl)-aniline,
2-nitro-4-phenoxy aniline,
2-nitro-4-phenylthio aniline,
2,4-diamino nitrobenzene,
2-nitro-4-ethylamino aniline, or 2-nitro-4-dimethylamino aniline is used in the above process in place of 2-nitro-4-(4'-fluorophenyl)-aniline, there is obtained 2-(3'-fluoro-2'-naphthyl)-benzimidazole,
2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or 2-(3'-fluoro-2'-naphthyl)-5-dimethylamino benzimidazole, respectively.

EXAMPLE 6

2-(3'-fluoro-2'-naphthyl)-benzimidazole 2 g. of n-propyl-3-fluoro-2-naphthimidate hydrochloride is added to 1 g. of o-phenylenediamine in 10 ml. of methanol. The resulting mixture is stirred for 1 hour, after which time 25 ml. of water and 10 ml. of 10% aqueous sodium bicarbonate are added. 2-(3'-fluoro-2'-naphthyl)-5-(4'-fluorophenyl)-benzimidazole precipitates and is filtered off, washed with ether, and air dried. The solid is washed with benzene and petroleum ether.

When 2-amino-4-fluoro aniline, 2-amino-4-chloro aniline
3,4-diaminobiphenyl,
3,4-diamino-4'-fluorobiphenyl,
2-amino-4-methoxy aniline,
3,4-diamino-3'-methoxybiphenyl,
2-amino-4-ethyl aniline,
2-amino-4-chloroethyl aniline,
2-amino-4-methylthio aniline,
2-amino-4-(2'-thienyl)-aniline,
2-amino-4-phenoxy aniline,
2-amino-4-phenylthio aniline,
2,4-diamino aniline,
2-amino-4-ethylamino aniline, or 2-amino-4-dimethylamino aniline is used in the above process in place of o-phenylenediamine, there is obtained 2-(3'-fluoro-2'-naphthyl)-5-fluoro benzimidazole,
2-(3'-fluoro-2'-naphthyl)-5-chloro benzimidazole,
2-(3'-fluoro-2'-fluoro-2'-naphthyl)--5-phenyl benzimidazole,
2-(3'-fluoro-2'-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or 2-(3'-fluoro-2'-naphthyl)-5-dimethylamino benzimidazole, respectively.

EXAMPLE 7

2-(3'-fluoro-2'-naphthyl)-benzimidazole 10 g. of 3-fluoro naphthalene-2-carboxylic acid chloride and 10 g. of o-nitroaniline are stirred together in 35 ml. of pyridine at room temperature for about 12 hours. At the end of this time, the mixture is quenched in ice water and the solid nitroanilide recovered by filtration and washed with dilute sodium carbonate solution. The solid is suspended in 150 ml. of glacial acetic acid, and 80 ml. of 6 N hydrochloric acid added to the suspension. 60 g. of zinc dust is added in small portions to the acetic mixture. After the zinc addition is complete, the reaction mixture is filtered and the filtrate neutralized with concentrated ammonium hydroxide to precipitate 2-(3'-fluoro-2'-naphthyl)-benzimidazole. The product is purified by recrystallization from ethylacetate.

When 2-nitro-4-fluoro aniline, 2-nitro-4-chloro aniline
3-amino-4-nitrobiphenyl,
3-amino-4-nitro-4'-fluorobiphenyl,
2-nitro-4-methoxy aniline,
3-amino-4-nitro-3'-methoxybiphenyl,
2-nitro-4-ethyl aniline,
2-nitro-4-chloroethyl aniline,
2-nitro-4-methylthio aniline,
2-nitro-4-(2'-thienyl)-aniline,
2-nitro-4-phenoxy aniline,
2-nitro-4-phenylthio aniline,
2,4-diamino nitrobenzene,
2-nitro-4-ethylamino aniline, or 2-nitro-4-dimethylamino aniline is used in the above process in place of o-nitroaniline, there is obtained 2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-(4'-fluorophenyl)-benzimidazole,
2-(3'-fluoro-2'-naphthyl)-5-methoxy benzimidazole,
2-(3'-fluoro-2'-naphthyl)-5-(3'-methoxyphenyl)-benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxybenzimidazole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or 2-(3'-fluoro-2'-naphthyl)-5-dimethylamino benzimidazole, respectively.

EXAMPLE 8

2-(3'-fluoro-2'-naphthyl)-benzimidazole 3 g. of 3-fluoro-2-naphthoic acid and 2 g. of o-phenylenediamine are mixed and added to 60 g. of polyphosphoric acid. The mixture is heated slowly with stirring to 240° C. and maintained at this temperature for 3 hours. The hot solution is then poured onto about 200 g. of ice. A taffy-like mass separates which dissolves on stirring.

The mixture is filtered and the filtrate neutralized with 30% sodium hydroxide. 2-(3'-fluoro-2'-naphthyl)-benzimidazole precipitates when a pH of about 6 is reached. It is then purified by filtration, washing with water and drying in air.

When 2-amino-4-fluoro aniline, 2-amino-4-chloro aniline,
3,4-diaminobiphenyl,
3,4-diamino-4'-fluorobiphenyl,
2-amino-4-methoxy aniline,
3,4-diamino-3'-methoxybiphenyl,
2-amino-4-ethyl aniline,
2-amino-4-chloroethyl aniline,
2-amino-4-methylthio aniline,
2-amino-4-(2'-thienyl)-aniline,
2-amino-4-phenoxy aniline,
2-amino-4-phenylthio aniline,
2,4-diamio aniline,
2-amino-4-ethylamino aniline, or 2-amino-4-dimethylamino aniline is used the above process in place of o-phenylenediamine, there is obtained, 2-(3'-fluoro-2'-naphthyl)-5-fluoro benzimidazole,
2-(3'-fluoro-2'-naphthyl)-5-chloro benzimidazole,
2-(3'-fluoro-2'-naphthyl)-5-phenyl benzimidazole,
2-(3'-fluoro-2'-naphthyl)-5-(4'-fluorophenyl)-
  benzimidazole,
2-(3'-fluoro-2'-naphthyl)-5-methoxy benzimidazole,
2-(3'-fluoro-2'-naphthyl)-5-(3'-methoxyphenyl)-
  benzimidazole,
2-(3'-fluoro-2'-naphthyl)-5-ethyl benzimidazole,
2-(3'-fluoro-2'-naphthyl)-5-chloroethyl benzimidazole,
2-(3'-fluoro-2'-naphthyl)-5-methylthio benzimidazole,
2-(3'-fluoro-2'-naphthyl)-5-(2'-thienyl)-benzimidazole,
2-(3'-fluoro-2'-naphthyl)-5-phenoxy benzimidazole,
2-(3'-fluoro-2'-naphthyl)-5-phenylthio benzimidazole,
2-(3'-fluoro-2'-naphthyl)-5-amino benzimidazole,
2-(3'-fluoro-2'-naphthyl)-5-ethylamino benzimidazole, or
2-(3'-fluoro-2'-naphthyl)-5-dimethylamino benz-
  imidazole, respectively.

EXAMPLE 9

1-benzoyl-2-(3'-fluoro-2'-naphthyl-benzimidazole

To 14 g. of 2-(3'-fluoro-2'-naphthyl)-benzimidazole is added sufficient 1:1 benzene-dimethylformamide, mixture to give substantial solution at gentle reflux. A few ml. of benzene is then distilled to dry the mixture. 4 g. of sodium hydride is added to the reaction flask as a suspension in dry benzene. While the reaction mixture is stirred (30 minutes), hydrogen gas evolves and the sodium salt is formed. 8 g. of benzoyl chloride in 10 ml. of dry benzene is added dropwise to the sodium salt. After 30 minutes of stirring at gentle reflux, the reaction mixture is cooled, diluted with 2 volumes of dry toluene and the organic layer is washed with small portions of cold water. The organic solvent solution is then dried over magnesium sulfate, filtered and concentrated to permit recovery of the desired 1-benzoyl-2-(3'-fluoro-2'-naphthyl)benzimidazole.

When acetyl chloride, propionyl chloride, butyroyl bromide, p-chlorobenzoyl chloride, p-nitrobenzoyl chloride, or toluolyl iodide is used in the above process in place of benzoyl chloride, there is obtained, 1-acetyl-2-(3'-fluoro-2'-naphthyl)-benzimidazole,
1-propionyl-2-(3'-fluoro-2'-naphthyl)-benzimidazole,
1-butyroyl-2-(3'-fluoro-2'-naphthyl)-benzimidazole,
1-p-chlorobenzoyl-2-(3'-fluoro-2'-naphthyl)-
  benzimidazole
1-p-nitrobenzoyl-2-(3'-fluoro-2'-naphthyl)-benzimidazole,
or 1-toluolyl-2-(3'-fluoro-2'-naphthyl)-benzimidazole,
  respectively.

EXAMPLE 10

1-methyl-2-(3'-fluoro-2'-naphthyl)-benzimidazole

A solution of 2 g. of the sodium salt of 2-(3'-fluoro-2'-naphthyl)-benzimidazole (prepared as in Example 9) is treated with 1.5 g. of methyl iodide and 7 ml. of benzene. After 1 hour at gentle reflux, the solution is poured into water and the aqueous phase is extracted with 3×50 ml. portions of benzene. The combined benzene solution is then washed with 3×25 ml. portions of water, 3 small portions of 1-N-sodium hydroxide, again with water, and further concentrated to dryness in vacuo. The 1-methyl-2-(3'-fluoro-2'-naphthyl)-benzimidazole thus obtained is purified by recrystallization from ethyl acetate.

When ethyl iodide, allyl bromide, or methallyl iodide is used in the above process in place of methyl iodide, there is obtained 1-ethyl-2-(3'-fluoro-2'-naphthyl)-benzimidazole, 1-allyl-2-(3'-fluoro-2'-naphthyl)-benzimidazole, and 1-methallyl-2-(3'-fluoro-2'-naphthyl)-benzimidazole, respectively.

EXAMPLE 11

Methyl-3-amino-2-naphthoate

A mixture of 70 ml. of 40% potassium hydroxide and 220 ml. of ether is cooled in an ice bath while 22 g. of N-nitrosomethylurea is added in portions. On completion of the addition the ether is decanted, and the residue is swirled with fresh ether which is then also decanted. The combined ether solutions contain at least 107 mmole of diazomethane.

The combined ether solution is cooled in an ice bath while 20 g. (107 mmoles) of 3-amino-2-naphthoic acid is added to it in portions. The resulting solution is allowed to warm to room temperature over a 45 minute period, and then 5 ml. of glacial acetic acid is added to decompose any excess diazomethane. A small amount of sediment is filtered off and the filtrate washed with 10% aqueous sodium bicarbonate and dried over anhydrous magnesium sulfate. The solution is then decolorized with activated charcoal, the charcoal removed, and the filtrated concentrated to a residue. The residue is triturated with petroleum ether to give 16.5 g. of methyl-3-amino-2-naphthoate, M.P. 100–102° C.

The product may be recrystallized from hexane to give substantially pure material but the unrecrystallized product is satisfactory for use in the next reaction.

EXAMPLE 12

Methyl-3-diazofluoroborate-2-naphthoate

A suspension of 8.17 g. (40.7 mmoles) of the ester obtained in Example 11 in 25 ml. of water is stirred vigorously while 25 ml. of 50% fluoboric acid is added to it. The color changes from yellow to grey. The mixture is then cooled to −5° C. in an ice salt bath, and a solution of 3.25 g. (47 mmole) of sodium nitrite in 6 ml. of water is added dropwise with stirring. The stirring is continued for a half hour after the addition is complete, and the solid product is filtered. The filter cake is washed with 8 ml. of fluoboric acid and then with 8 ml. of methanol. It is finally washed with ether and dried under vacuum. The methyl-3-diazofluoborate-2-naphthoate thus obtained melts with decomposition at 152–155° C.

EXAMPLE 13

Methyl-3-fluoro-2-naphthoate 11.45 g. of methyl-3-diazofluoborate-2-naphthoate is suspended in 250 ml. of dry mesitylene at room temperature and stirred while the temperature is gradually increased. The first sign of reaction occurs at a bath temperature of 140° C., and at 170° C. the reaction becomes vigorous. The mesitylene is refluxed until gas evolution stops. The mixture is then cooled, diluted with ether and filtered. The apparatus is rinsed with ether which is also filtered. The filtrates are combined and concentrated to a residue (22 g.) consisting predominantly of methyl-3-fluoro-2-naphthoate. It is hydrolyzed directly to the free acid.

EXAMPLE 14

3-fluoro-2-naphthoic acid

The ester obtained in Example 13 above is dissolved in 100 ml. of methanol and 100 ml. of 2 N methanolic potassium hydroxide is added. The mixture is refluxed on a steam cone until a vigorous reaction occurs. The potassium salt of 3-fluoro-2-naphthoic acid precipitates. The reaction mixture is then heated for ten minutes longer, cooled and diluted with water. The solution is washed and extracted with ether. The ether extracts are combined, washed with saturated aqueous sodium chloride, dried over anhydrous magnesium sulfate, treated with decolorizing charcoal and filtered. The filtrate is then concentrated in vacuo to a residue (4.9 g.) of 3-fluoro-2-naphthoic acid, M.P. 181–193° C. This is boiled in benzene. It is then diluted with hexane, cooled and the solid filtered to give 4.1 g. of 3-fluoro-2-naphthoic acid, M.P. 191–194° C.

EXAMPLE 15

3-fluoronaphthalene-2-carboxamide 4.1 g. (21.6 moles) of 3-fluoro-2-naphthoic acid is heated in 20 ml. of thionyl chloride containing a few drops of dimethylformamide. A vigorous reaction occurs and when the reaction ceases (5–10 minutes) the mixture is concentrated to a residue. This is dissolved in benzene and concentrated to a residue again. This residue is dissolved in 100 ml. of benzene and anhydrous ammonia bubbled through the solution for about 30 minutes. The mixture is then treated with water and with ethyl acetate to give two liquid phases. The organic phase is separated, washed with saturated aqueous sodium chloride, dried over magnesium sulfate and treated with decolorizing charcoal. The solution is filtered and concentrated to a residue which is triturated with ether and filtered again. The solid product thus obtained is washed with ether and dried to give 3-fluoronaphthalene-2-carboxamide (3.3 g.), M.P. 155–157° C.

EXAMPLE 16

3-fluoro-2-naphthonitrile

A solution of 1.5 g. of 3-fluoronaphthalene-2-carboxamide in 15 ml. of thionyl chloride containing a few drops of dimethylformamide is heated on the steam cone. There is a short brisk evolution of gas. After about 15 minutes the mixture is concentrated to a residue which is slurried in benzene and again concentrated to a residue. The residue is then extracted with hot benzene, the extract diluted with hexane and cooled. A small amount of solid is filtered off and the filtrate concentrated again to a residue which crystallizes on trituration with petroleum ether to give 3-fluoro-2-naphthonitrile, M.P. 99–106° C.

The product is dissolved in ether and passed through a column of 3 g. of aluminum oxide. The column is eluted with ether and the eluate concentrated to dryness to give 3-fluoro-2-napthonitrile, M.P. 103–106° C.

EXAMPLE 17

Ethyl-3-fluoro-2-naphthimidate hydrochloride

A solution of 1.9 g. of 3-fluoro-2-naphthonitrile in 50 ml. of absolute ethanol is cooled in an ice bath and saturated with anhydrous hydrogen chloride. The solution is allowed to stand in the refrigerator for 15 hours. 5 ml. of the solution is removed and diluted with 75 ml. of ether. The resulting solution is concentrated to a residue and triturated with benzene. On scratching 58 mg. of ethyl-3-fluoro-2-naphthimidate hydrochloride crystallizes.

The remainder of the ethanol solution is diluted with benzene and concentrated to a residue. The residue is triturated with benzene, concentrated to a residue, and the residue shaken with dry ether. The resulting solid is filtered and air dried to give ethyl-3-fluoro-2-naphthimidate hydrochloride, M.P. 130° C. (dec.).

EXAMPLE 18

2-fluoro-naphthaldehyde 17.1 g. of fluoronaphthoic acid in 80 ml. of thionyl chloride is treated with a few drops of dimethylformamide and warmed on the steam cone. After fifteen minutes, the solution is concentrated to a residue, dissolved in benzene and concentrated to a new residue. A benzene solution of the crude acid chloride is treated with 5 ml. of methanol, refluxed for a few minutes, and heated until an oily residue, methyl-3-fluoro-2-naphthoate, is obtained.

A solution of 22 g. of ethyl iodide in 50 ml. of dry ether is added slowly to a suspension of 6.75 g. of magnesium turning in 400 ml. of dry ether. The reaction starts promptly and is controlled by the rate of addition. When it ceases, a solution of 29 ml. of N-methylaniline in 150 ml. of dry ether is added. A precipitate forms which partially dissolves after stirring for one hour.

Methyl-3-fluoro-2-naphthoate is dissolved in 100 ml. of dry ether and added to the mixture. After a one-hour reflux, an oil forms. The reaction mixture is cooled and treated with 300 ml. of 1 N hydrochloric acid. The layers formed are separated and the aqueous phase is extracted with fresh ether. The combined ether solution is washed with 1 N hydrochloric acid and with saturated sodium chloride, dried over magnesium sulfate and taken to a residue to give N-methyl-N-phenyl-2-fluoronaphthyl carboxamide.

A solution of 15 g. of the N-methyl-N-phenyl amide in 150 ml. of freshly distilled tetrahydrofuran is cooled to —10° C. with stirring. 650 mg. of lithium aluminum hydride is added so that the temperature remains below —0° C. The mixture is stirred overnight at —5° C. With strong cooling 100 ml. of 2 N hydrochloric acid is added followed by 100 ml. of ice water and 100 ml. of ether. The layers are separated and the aqueous phase is extracted three times with 100 ml. of ether. The combined ether solution is washed with standard sodium chloride solution, dried and concentrated to give 2-fluoro naphthaldehyde.

It should be understood that although this invention has been described with reference to particular embodiments thereof, changes and modifications may be made which are within its intended scope and it should be limited only by the language of the appended claims.

We claim:

1. A compound having the formula:

[Structural formula showing compound with $R_1$ substituent, N, NH, and F groups]

wherein $R_1$ is a member selected from the group consisting of phenyl and p-fluorophenyl, or a non-toxic acid addition salt thereof.

2. A compound according to claim 1 wherein $R_1$ is p-fluorophenyl, or a non-toxic acid addition salt thereof.

3. A compound according to claim 1 wherein $R_1$ is phenyl, or a non-toxic acid addition salt thereof.

References Cited

UNITED STATES PATENTS

| | | | |
|---|---|---|---|
| 3,080,282 | 3/1963 | Shunk | 260—309.2 |
| 3,192,226 | 6/1965 | Sarett et al. | 260—309.2 |
| 3,192,227 | 6/1965 | Brown et al. | 260—309.2 |

NATALIE TROUSOF, Primary Examiner

U.S. Cl. X.R.

260—141, 453, 465, 469, 471, 515, 544, 553, 558, 564, 566, 578, 599; 424—273